(12) United States Patent
Jagdale et al.

(10) Patent No.: US 10,265,771 B2
(45) Date of Patent: Apr. 23, 2019

(54) ADDITIVE MANUFACTURE OF ELECTRICALLY CONDUCTIVE MATERIALS

(71) Applicant: Delavan Inc, West Des Moines, IA (US)

(72) Inventors: Vijay Jagdale, South Windsor, CT (US); Tahany I. El-Wardany, Bloomfield, CT (US); Wayde R. Schmidt, Pomfret Center, CT (US)

(73) Assignee: Delavan Inc., Wes Des Moines, IA (US)

( * ) Notice: Subject to any disclaimer, the term of this patent is extended or adjusted under 35 U.S.C. 154(b) by 575 days.

(21) Appl. No.: 14/936,428

(22) Filed: Nov. 9, 2015

(65) Prior Publication Data

US 2017/0129009 A1    May 11, 2017

(51) Int. Cl.
*B22F 3/10*    (2006.01)
*B33Y 70/00*   (2015.01)
(Continued)

(52) U.S. Cl.
CPC .......... *B22F 3/1003* (2013.01); *B22F 3/1055* (2013.01); *B22F 7/02* (2013.01); *B22F 7/06* (2013.01); *B29C 64/153* (2017.08); *B33Y 70/00* (2014.12); *C22C 26/00* (2013.01); *C22C 32/0084* (2013.01); *B22F 2202/11* (2013.01); *B22F 2301/052* (2013.01); *B22F 2301/10* (2013.01); *B22F 2301/25* (2013.01); *B22F 2302/40* (2013.01); *B22F 2998/10* (2013.01);
(Continued)

(58) Field of Classification Search
CPC ........ B22F 3/1003; B22F 3/1055; B22F 7/02; B22F 2202/11; B22F 2301/052; B22F 2301/10; B22F 2301/25; B22F 2302/40; B33Y 10/00
See application file for complete search history.

(56) References Cited

U.S. PATENT DOCUMENTS 5,068,150 A   11/1991  Nakamura et al.
5,649,277 A    7/1997  Greul et al.
(Continued)

FOREIGN PATENT DOCUMENTS

EP   2918359 A1   9/2015
GB   2422344 A    7/2006
(Continued)

OTHER PUBLICATIONS

Search Report under Section 17(5), of the United Kingdom Intellectual Property Office, dated Apr. 13, 2017, issued in corresponding UK Patent Application No. GB1618764.3.

*Primary Examiner* — Thorl Chea
(74) *Attorney, Agent, or Firm* — Locke Lord LLP; Scott D. Wofsy; Joshua L. Jones

(57) ABSTRACT

A method of additive manufacturing includes depositing a layer of absorptive material onto a workpiece, depositing a layer of additive manufacturing stock powder onto the workpiece, and fusing the stock powder to the workpiece using a focused energy source at a wavelength wherein the absorptive material has a higher absorptivity at the wavelength of the focused energy source than the absorptivity of the stock powder at that wavelength. The focused energy source can be a laser, e.g., with a 1064 nm wavelength, for example.

14 Claims, 3 Drawing Sheets

(51) Int. Cl.
  *B22F 7/06*      (2006.01)
  *B29C 64/153*    (2017.01)
  *C22C 32/00*     (2006.01)
  *C22C 26/00*     (2006.01)
  *B22F 3/105*     (2006.01)
  *B22F 7/02*      (2006.01)
  *B33Y 10/00*     (2015.01)
  *B33Y 80/00*     (2015.01)

(52) U.S. Cl.
  CPC .............. *B33Y 10/00* (2014.12); *B33Y 80/00* (2014.12); *Y02P 10/295* (2015.11)

(56) References Cited

U.S. PATENT DOCUMENTS

| | | |
|---|---|---|
| 2007/0238056 A1 | 10/2007 | Baumann et al. |
| 2014/0151013 A1 | 6/2014 | Wallmeroth et al. |
| 2015/0034604 A1 | 2/2015 | Subramanian et al. |
| 2015/0125334 A1 | 5/2015 | Uetani et al. |
| 2017/0157852 A1 | 6/2017 | Ederer et al. |

FOREIGN PATENT DOCUMENTS

| | | | |
|---|---|---|---|
| GB | 2493398 A | | 2/2013 |
| KR | 1020160091329 A | | 8/2016 |
| WO | 2015078430 | * | 6/2015 |

* cited by examiner

US 10,265,771 B2

ADDITIVE MANUFACTURE OF ELECTRICALLY CONDUCTIVE MATERIALS

GOVERNMENT LICENSE RIGHTS STATEMENT

This invention was made with government support under Contract No. DE-AR-0000308 awarded by the Department of Energy. The government has certain rights in the invention.

BACKGROUND OF THE INVENTION

1. Field of the Invention

The present disclosure relates to manufacturing, and more particularly to additive manufacturing.

2. Description of Related Art

Laser based additive manufacturing (e.g. laser powder bed fusion, laser directed energy deposition) to form fully dense components has become a very valuable manufacturing technique that has allowed designers to design components not practical with traditional manufacturing techniques. Various metal systems can be processed using laser powder bed fusion (LBPF) process or sometimes referred to as laser sintering. However, in the case of highly reflective materials, the laser energy used to form the powder bed fusion may not be sufficiently absorbed by the material to fuse the successive layers together adequately. This has been an important limitation for certain applications of laser sintering, such as where high purity copper or aluminum components are needed, e.g., for electrical components or heat exchangers. Traditional techniques for additive manufacture of copper components involve reducing the purity of the copper alloy used in order to assure proper powder bed fusion.

Such methods have generally been considered satisfactory for their intended purpose, but the resultant electrical conductivity properties are very poor. However, there is still a need in the art for improved additive manufacturing techniques. The present disclosure provides a solution for this need

SUMMARY OF THE INVENTION

A method of additive manufacturing includes depositing a layer of absorptive material onto a workpiece, depositing a layer of additive manufacturing stock powder onto the workpiece, and fusing the stock powder to the workpiece using a focused energy source at a wavelength wherein the absorptive material has a higher absorptivity at the wavelength of the focused energy source than the absorptivity of the stock powder at that wavelength. The focused energy source can be a laser, e.g., with a 1064 nm wavelength, for example.

The method can include successively depositing the layers of the absorptive material and the stock powder and fusing each successive layer of the stock powder to the workpiece to form a multi-layer powder bed fusion component. The multi-layer powder bed fusion component can include an electrically conductive material of greater than 95% purity. The electrically conductive material can include at least one of copper, aluminum or a noble metal. The electrically conductive material can include copper of greater than 99.9% purity, for example. The absorptive material can include at least one of graphite, carbon black, graphene, any other suitable carbon based material, or any other suitable absorbent paint or paints.

Depositing the layer of stock powder can include depositing the layer of the stock powder to a thickness in the range of 10 to 200 microns, inclusive. Depositing the layer of absorptive material can include depositing the layer of absorptive material to a thickness of less than or equal to 9 microns.

The method can include oxidizing the workpiece after fusing the stock powder thereto to remove residual from the absorptive material from the workpiece. It is also contemplated that the method can include reducing an oxide layer from the workpiece after oxidizing. For example, the method can include successively depositing the layers of the stock powder and the absorptive material, fusing each successive layer of the stock powder to the workpiece, oxidizing the workpiece after fusing each layer, and reducing the oxide from the workpiece each time after oxidizing to form a multi-layer powder bed fusion component.

Depositing the layer of additive manufacturing stock powder can include depositing the layer of additive manufacturing stock powder after depositing the layer of absorptive material to coat the absorptive material with the layer of additive manufacturing stock powder. It is also contemplated that optionally, the layer of additive manufacturing stock powder can be deposited before the layer of absorptive material. The method can include controlling the thickness of the absorptive material layer with a recoater blade or sprayer.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
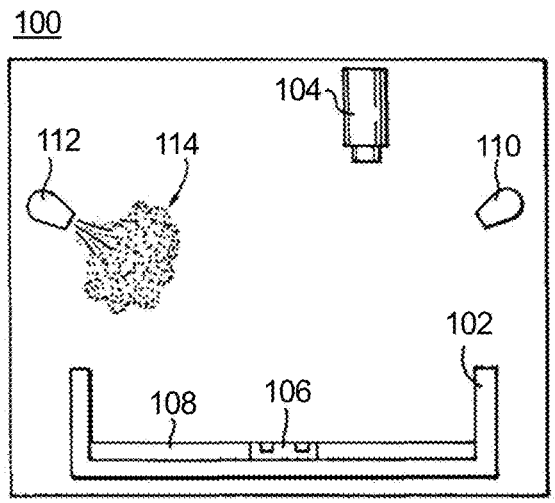
FIG. 1 is a schematic side elevation view of an exemplary embodiment of a method of additive manufacturing in accordance with the present disclosure, showing additive manufacturing stock powder being deposited on a workpiece.

Reference will now be made to the drawings wherein like reference numerals identify similar structural features or aspects of the subject disclosure. For purposes of explanation and illustration, and not limitation, a partial view of an exemplary embodiment of a method in accordance with the disclosure is shown in FIG. 1, wherein the corresponding system is designated generally by reference character 100. Other embodiments of systems and methods in accordance with the disclosure, or aspects thereof, are provided in FIGS. 2-7, as will be described. The systems and methods described herein can be used to enable additive manufacture of high purity material resulting in superior electrical conductivity properties, for example. The systems and methods described herein can be used for laser sintering of highly reflective materials such as high purity copper as well as aluminum and some noble metals such as silver and gold, and the like. This provides for additively manufactured structures of highly reflective materials not previously attainable with main stream sintering equipment. Such highly reflective materials include high purity metals, such as high purity copper and/or aluminum components for electric machines, heat exchangers, electric circuitry and the like.

System 100 can be used to perform a method of additive manufacturing, for example to form components out of highly reflective materials. System 100 includes a build platform 102 and a focused energy source such as a laser 104, wherein at least one of the build platform 102 and laser 104 can move relative to a stationary reference to allow the laser 104 to scan workpiece 106 to fuse additive manufacturing stock powder 108 to workpiece 106. System 100 also includes a nozzle 110 for spraying or issuing layers of stock powder 108, and a nozzle 112 for spraying or issuing layers of absorptive material 114, in powder, spray or other form.

Figure 2:
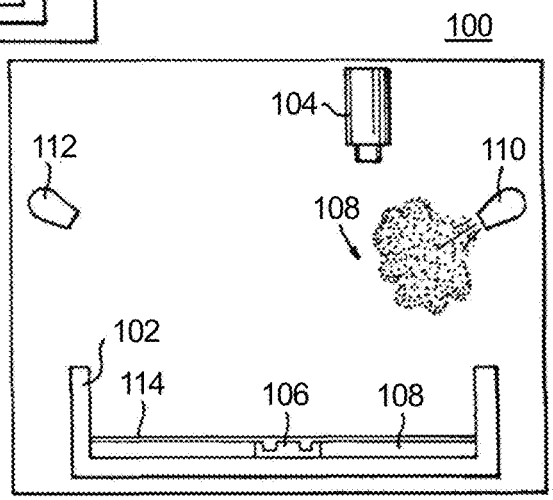
FIG. 2 is a schematic side elevation view of the method of FIG. 1, showing coating of the layer of additive manufacturing stock powder with a layer of an absorptive material.

The method includes coating the workpiece 106 or previously deposited layer with a layer of an absorptive material 114. Absorptive material 114 is shown issuing from nozzle 112 in FIG. 1, and FIG. 2 shows the newly formed layer of absorptive material 114 coating the workpiece 106 or previously deposited layer. The method that includes depositing a layer of additive manufacturing stock powder 108 onto a layer of absorptive material 114. FIG. 2 shows the stock powder 108 issuing from nozzle 110, and FIG. 2 shows the newly formed layer of stock powder 108 covering over workpiece 106 and optionally over the previously formed layer of stock powder 108. Optionally, the order of the layers of absorptive material 114 and stock powder 108 can be reversed.

Figure 3:
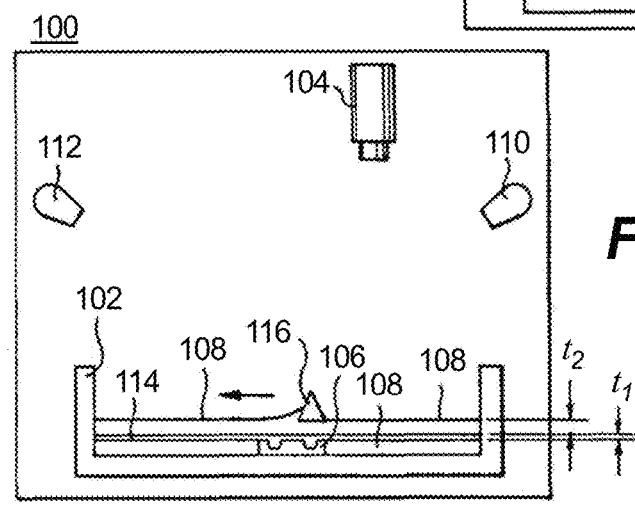
FIG. 3 is a schematic side elevation view of the method of FIG. 1, showing optional control of layer thickness with a recoater.

With continued reference to FIG. 3, the method can include spreading and controlling the thickness of the absorptive powder 114 with a recoater blade 116, which moves in the direction indicated by the large arrow in FIG. 3. Those skilled in the art will readily appreciate that optionally a similar action of a recoater blade can be used to coat the newly formed layer of stock powder 108. Depositing the layer of stock powder 108 can include depositing the layer of the stock powder to a thickness $t_2$ in the range of 10 to 200 microns, inclusive. Depositing the layer of absorptive material 114 can include depositing the layer of absorptive material 114 to a thickness $t_1$ of less than or equal to about 9 microns. Those skilled in the art will readily appreciate that any suitable technique can be used for depositing the layers, including powder spraying nozzles incorporated into a recoater mechanism.

Figure 4:
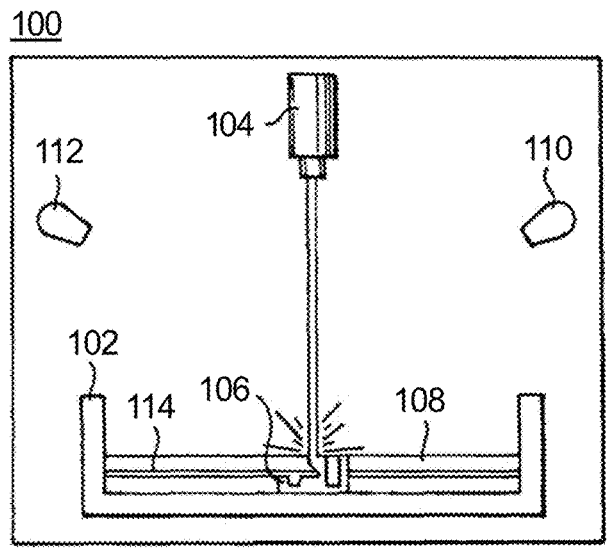
FIG. 4 is a schematic side elevation view of the method of FIG. 1, showing a laser fusing the stock powder to the workpiece.

With reference now to FIG. 4, the method includes fusing the stock powder 108 to the workpiece 106 using laser 104. The absorptive material 114 has a higher absorptivity at the wavelength of the laser 104 than the absorptivity of the stock powder 108 and the workpiece 106 or the previously deposited solid of the same material as the stock powder 108 at that wavelength. For example, the laser can have a 1064 nm wavelength, which is a predominant wavelength used in commercial production laser additive manufacturing machines. Absorptive material 114 improves laser energy absorption in both stock powder 108 as well as in the substrate of workpiece 106 to which the stock powder 108 is to be fused when compared with traditional techniques. The ratio of thicknesses $t_1$ and $t_2$ is conducive to limiting the impurity introduced into the material of workpiece 106 as a result of including absorptive material 114 in the powder bed fusion process.

Figure 5:
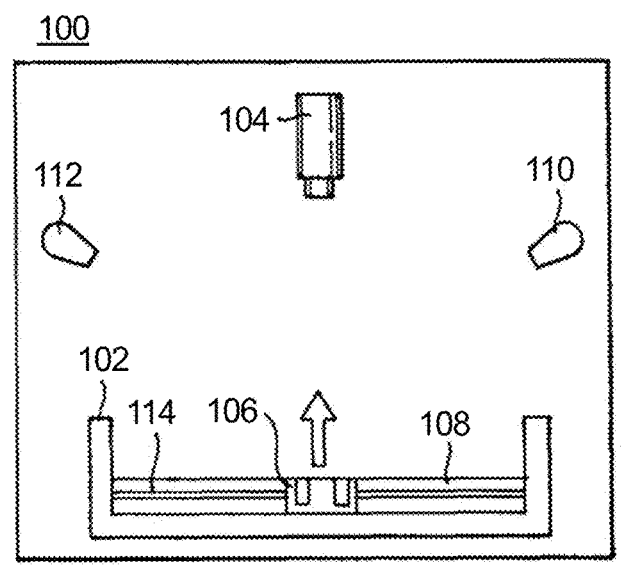
FIG. 5 is a schematic side elevation view of the method of FIG. 1, showing optional oxidization and reduction of oxide to remove residual absorptive material from the workpiece after fusing with the laser.

Referring now to FIG. 5, to further enhance purity in workpiece 106, the method can optionally include at least partially oxidizing the workpiece 106 after fusing the stock powder 108 thereto to remove undesirable residual from the absorptive material 114 from the workpiece 106. This can optionally be followed by at least partially reducing remaining undesirable oxide from the workpiece 106 after oxidizing. The oxidation and reduction are indicated schematically in FIG. 5 by the large arrow.

The method can include successively coating each previously deposited layer with a layer of absorptive material 114, depositing the layers of the stock powder 108, and fusing each successive layer of the stock powder 108 to the workpiece to build up a workpiece 106 as a multi-layered powder bed fusion component. Optionally, the oxidization and reduction described above can also be repeated for each successive layer, or for every few layers, fused to the workpiece 106.

The workpiece 106, or multi-layer powder bed fusion component, resulting from the methods described herein can include an electrically conductive material of greater than 95% purity. The electrically conductive material can include at least one of copper, aluminum or a noble metal such as silver or gold or alloys including these. For example, the resulting workpiece 106 can be made of copper of greater than 99.9% purity. The absorptive material 114 can include at least one of graphite, carbon black, graphene, or other carbon-containing material or absorbent paints.

Figure 6:
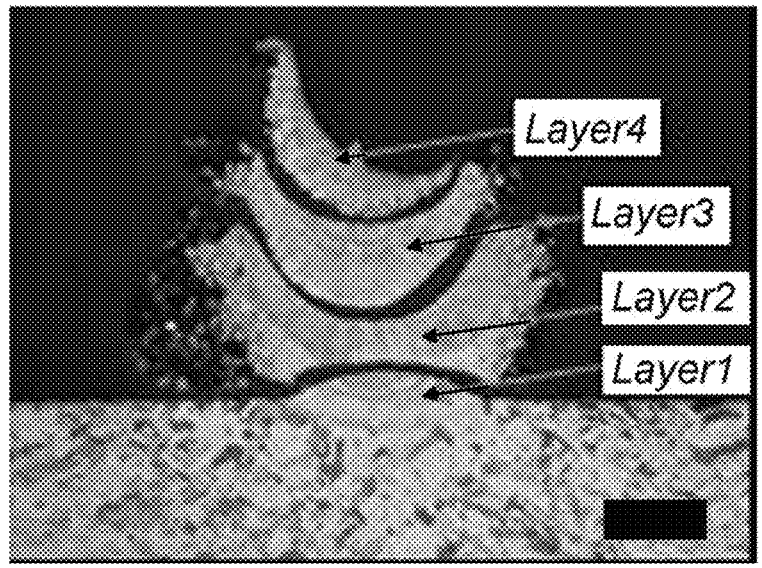
FIGS. 6 and 7 are images of two powder bed fusions, one in which high purity copper was deposited without coating the stock powder layer with a layer of absorptive material, and one with coating the stock powder with absorptive material, respectively.
Figure 7:
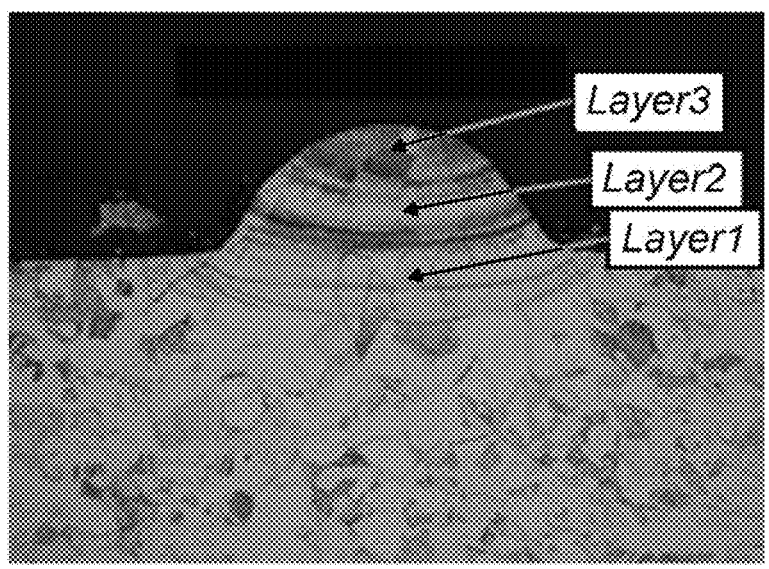

As shown in FIG. 6, attempting to fuse high purity copper or other reflective materials directly results in failed bonding between the build layers. FIG. 6 shows four layers that were deposited but failed to bond to one another. FIG. 7, on the other hand, shows three layers of well fused copper, which were formed using techniques as described herein.

The methods and systems of the present disclosure, as described above and shown in the drawings, provide for additive manufacturing with superior properties including the ability to additively manufacture highly reflective materials such as copper, aluminum, or high purity noble metals such as silver and gold. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of additive manufacturing comprising:
   depositing a layer of absorptive material onto a workpiece;
   depositing a layer of metallic additive manufacturing stock powder onto the workpiece; and
   fusing the stock powder to the workpiece using a focused energy source at a wavelength wherein the absorptive material has a higher absorptivity at the wavelength of the focused energy source than the absorptivity of the stock powder at that wavelength, wherein depositing the layer of additive manufacturing stock powder includes depositing the layer of additive manufacturing stock powder after depositing the layer of absorptive material to coat the absorptive material with the layer of additive manufacturing stock powder.

2. The method as recited in claim 1, further comprising:
   successively depositing the layers of the absorptive material and the stock powder and fusing each successive layer of the stock powder to the workpiece to form a multi-layer powder bed fusion component.

3. The method as recited in claim 2, wherein the multi-layer powder bed fusion component includes an electrically conductive material of greater than 95% purity.

4. The method as recited in claim 3, wherein the electrically conductive material includes at least one of copper, aluminum or a noble metal.

5. The method as recited in claim 3, wherein the electrically conductive material includes copper of greater than 99.9% purity.

6. The method as recited in claim 1, wherein focused energy source is a laser that has a 1064 nm wavelength.

7. The method as recited in claim 1, wherein depositing the layer of stock powder includes depositing the layer of the stock powder to a thickness in the range of 10 to 200 microns, inclusive.

8. The method as recited in claim 1, wherein depositing the layer of absorptive material includes depositing the layer of absorptive material to a thickness of less than or equal to about 9 microns.

9. The method as recited in claim 1, further comprising oxidizing the workpiece after fusing the stock powder thereto to remove residual from the absorptive material from the workpiece.

10. The method as recited in claim 1, wherein the absorptive material includes at least one of graphite, carbon black, or graphene.

11. The method as recited in claim 1, further comprising controlling the thickness of the absorptive material layer with a recoater blade or sprayer.

12. A method of additive manufacturing comprising:
    depositing a layer of absorptive material onto a workpiece;
    depositing a layer of metallic additive manufacturing stock powder onto the workpiece; and
    fusing the stock powder to the workpiece using a focused energy source at a wavelength wherein the absorptive material has a higher absorptivity at the wavelength of the focused energy source than the absorptivity of the stock powder at that wavelength, further comprising oxidizing the workpiece after fusing the stock powder thereto to remove residual from the absorptive material from the workpiece further comprising reducing an oxide layer from the workpiece after oxidizing.

13. The method as recited in claim 12, wherein depositing the layer of absorptive material includes depositing the layer of absorptive material after depositing the layer of additive manufacturing stock powder to coat the additive manufacturing stock powder with the absorptive material.

14. A method of additive manufacturing comprising:
    depositing a layer of absorptive material onto a workpiece;
    depositing a layer of metallic additive manufacturing stock powder onto the workpiece; and
    fusing the stock powder to the workpiece using a focused energy source at a wavelength wherein the absorptive material has a higher absorptivity at the wavelength of the focused energy source than the absorptivity of the stock powder at that wavelength, further comprising oxidizing the workpiece after fusing the stock powder thereto to remove residual from the absorptive material from the workpiece, further comprising:
    successively depositing the layers of the absorptive material and the stock powder, fusing each successive layer of the stock powder to the workpiece, oxidizing the workpiece after fusing each layer, and reducing the oxide from the workpiece each time after oxidizing to form a multi-layer powder bed fusion component.

* * * * *